3,042,684
3-β-ETHYL-β-NITROVINYLINDOLE
Edwin Harry Paterson Young, Manchester, England, assignor to Imperial Chemical Industries Limited, London, England, a corporation of Great Britain
No Drawing. Filed Mar. 3, 1958, Ser. No. 718,420
Claims priority, application Great Britain Feb. 13, 1956
1 Claim. (Cl. 260—319)

The present invention relates to new procedures and intermediates useful in the preparation of compounds possessing pharmacological properties, e.g. 5-hydroxytryptamine.

Certain methoxy derivatives of indole-3-aldehyde have hitherto been prepared but only in very low yields. Accordingly, one of the purposes of the present invention is to provide an improved process for the manufacture of methoxyindole-3-aldehydes as well as other derivatives of indole-3-aldehyde including, for example, the hitherto unknown benzyloxyindole-3-aldehydes.

Broadly stated, the process is concerned with the manufacture of indole-3-aldehydes of the formula:

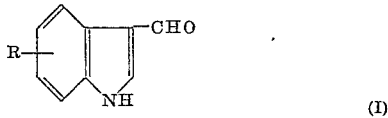

wherein R stands for halogen, alkyl, alkoxy and aryloxy radicals, by treating an indole derivative of the formula:

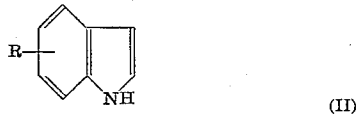

wherein R has the meaning stated above, with dimethylformamide and either a phosphorus halide or a phosphorus oxyhalide. A preferred phosphorus oxyhalide is, for example, phosphorus oxychloride, and preferred phosphorus halides are phosphorus tribromide and phosphorus pentachloride.

The process may conveniently be carried out in a suitable diluent or solvent. As suitable diluents or solvents for this purpose there may be used, for example, dimethylformamide and/or dioxan.

As examples of indoles which may be used as starting materials in the above process there may be mentioned 5-methoxyindole, 6-methoxyindole, 5-benzyloxyindole, 6-benzyloxyindole, 5-methylindole, 6-methylindole, 5-chloroindole and 6-chloroindole.

New compounds obtained by the process described above may be represented by the formula:

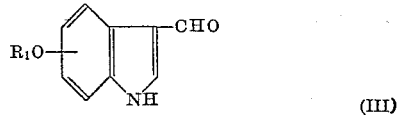

wherein $R_1$ is a benzyl radical.

The indole-3-aldehydes identified in Formula I above and indole-3-aldehyde itself may be used, according to another aspect of the invention, to prepare novel 3-β-nitrovinylindoles of the formula:

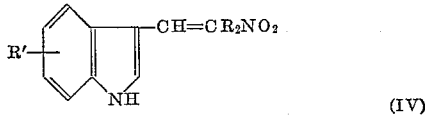

wherein R' stands for hydrogen, halogen, alkyl, alkoxy and aryloxy radicals and $R_2$ is selected from the group consisting of hydrogen and alkyl radicals. These 3-β-nitrovinylindoles (Formula IV) may be prepared by condensing the indole-3-aldehydes defined by Formula I with a nitroparaffin.

As examples of indole-3-aldehydes which may be condensed in the manner indicated in the preceding paragraph, there may be mentioned indole-3-aldehyde, 5-methoxyindole-3-aldehyde, 6 - methoxyindole-3-aldehyde, 5 - benzyloxyindole-3-aldehyde, 6-benzyloxyindole-3-aldehyde, 5-methylindole-3-aldehyde and 5-chloroindole-3-aldehyde.

As examples of nitroparaffins which may be used in the above-mentioned condensation, there may be mentioned nitromethane, nitroethane, nitropropane and nitrooctane.

Condensation of the indole-3-aldehydes to give the 3-β-nitrovinylindoles of Formula IV may conveniently be brought about by heating the reactants together, preferably in the presence of a basic substance as catalyst and conveniently also in the presence of a solvent or diluent.

Solvents or diluents which may be used include, for example, acetic acid, β-ethoxyethanol, dimethylformamide and excess of the nitroparaffin used as reactant such as nitromethane, nitroethane, n-nitropropane and n-1-nitrooctane. Basic substances which may be used as catalysts include, for example, ammonium acetate, methylamine, n-butylamine and benzylamine.

Preferred conditions for condensation are the use of excess of the nitroparaffin used as reactant such as nitromethane and nitroethane in the presence of ammonium acetate as a catalyst.

According to a further aspect of the invention, indole compounds of the formula:

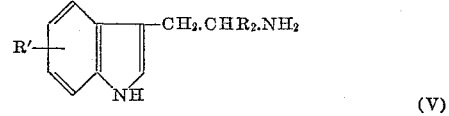

wherein R' and $R_2$ have the meaning stated above, and the salts of such compounds are prepared by reducing the 3-β-nitrovinylindoles of Formula IV. The reduction may be brought about by conventional methods, for example, by heating the 3-β-nitrovinylindole starting materials with lithium aluminium hydride, conveniently in the presence of an ether as solvent, for example, tetrahydrofuran, or diethylether or mixtures thereof.

As suitable salts of the compounds of Formula V there may be mentioned the hydrochlorides, picrates, succinates, sulphates, oxalates, toluene-p-sulphonates and the like.

Certain of the indole compounds encompassed by Formula V are known compounds, for example tryptamine, 5-benzyloxy-, 5-methoxy-, 5-ethoxy-, 6-methoxy-, 7-methoxy, 7-methyltryptamine, 3-β-aminopropylindole and 3-β-aminobutylindole. Novel compounds encompassed by Formula V include those having the formula:

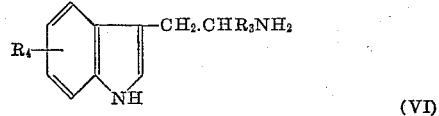

wherein $R_3$ stands for an alkyl radical and $R_4$ stands for a radical selected from the group consisting of aryloxy, alkyl and alkoxy radicals, and the salts of such compounds. Other new compounds contemplated by the invention are 5-chlorotryptamine and 6-benzyloxytryptamine.

The compounds represented by Formula V are themselves useful as pharmaceutical products and are particularly useful in the preparation of other compounds possessing pharmacological properties, e.g. 5-hydroxytryptamine and/or equivalent compounds using methods known in the art. Thus, for example, compounds illustrated by Formula V, e.g. 5-benzloxy-3-β-(aminoethyl)-indole may be converted to 5-hydroxytryptamine in the manner described by Hamlin and Fischer in the Journal of the American Chemical Society, 1951, volume 73, page 5007, or by Speeter, Heinzelmann and Weisblat in the Journal of the American Chemical Society, 1951, volume 73, page 5514, or in U.S. Patent No. 2,715,129.

The utility of the various intermediates (Formulae I, IV and V) described herein is further illustrated by the following diagram using, for exemplification, the conversion of 5-benzyloxyindole to 5-hydroxytryptamine (serotonin):

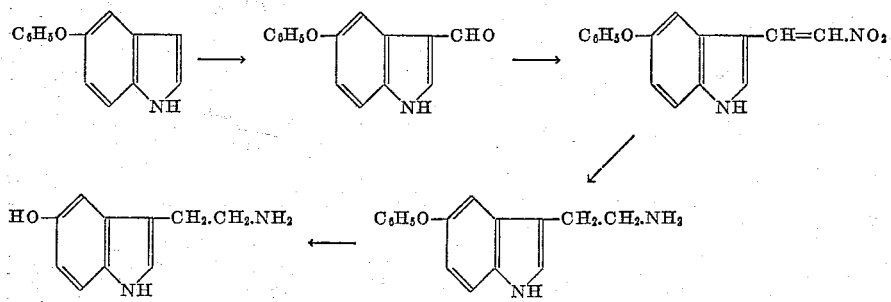

As indicated serotonin is a known compound (Journal of the American Chemical Society, 1951, volume 73, pages 5007 and 5514, and in U.S. 2,715,129) and is available commercially in the form of the mixed sulphate with creatinine sulphate. It is a vasoconstrictor and recent clinical evaluation of this compound have utilized its haemostatic action and it has been used both parenterally and topically mainly in idiopathic thrombocytopenic purpura.

It might also be noted that compounds within Formula V wherein the R substituent is other than hydrogen, e.g. benzyloxy, may be used to prepare such other known compounds as serotonin or the like by removing the R substituent in conventional manner.

The various aspects of the invention are illustrated, but not limited, by the following examples in which parts are by weight:

PREPARATION OF INDOLE-3-ALDEHYDES, FORMULA I

Example 1

8.4 parts of phosphorus oxychloride are added to 16 parts of dimethylformamide stirred at 10° to 20° C. A solution of 8.3 parts of 5-benzyloxyindole in 4 parts of dimethylformamide is added at 20° C. to 30° C. The mixture is then heated at 35° C., during 45 minutes. It is then cooled and added to 100 parts of crushed ice. The mixture is stirred and a solution of 9.5 parts of sodium hydroxide in 50 parts of water is added slowly at 20° C. to 30° C. The rate of addition of the aqeuous sodium hydroxide solution is such that 75% of the said solution is added during about 30 minutes whilst the mixture is still acid and the remaining 25% of the said solution is then added all at once. The mixture is then boiled for 2 minutes and then filtered. The solid residue is washed with cold water, dried and crystallized from ethanol. 5-benzyloxyindole-3-aldehyde is obtained of M.P. 237–238° C., in a yield of 85% calculated on the 5-benzyloxyindole used.

Example 2

5 parts of phosphorus oxychloride are added to 10 parts of dimethylformamide at 10° to 20° C. To the mixture 4.33 parts of 6-methoxyindole in 5 parts of dimethylformamide are added at 20° to 30° C. The mixture is then heated at 35° C. to 40° C., during 45 minutes and is then poured into a mixture of 100 parts of ice and 50 parts of water. A solution of 8 parts of potassium hydroxide in 50 parts of water is added slowly at 15° to 20° C., at such a rate that when 75% of the said solution is added, the mixture is still acid and the remaining 25% of the said solution is then added at once. The mixture is then boiled for 2 minutes, cooled, and filtered and the solid residue is washed with water. The product so obtained is 6-methoxyindole-3-aldehyde of M.P. 187–189° C., in a yield of 83% calculated on the 6-methoxyindole used.

Example 3

5 parts of phosphorus oxychloride are added to 15 parts of dimethylformamide at 10° to 20° C. To the mixture a solution of 4.3 parts of 5-methoxyindole in 5 parts of dimethylformamide is added at 20° to 30° C. The mixture is heated at 35° to 36° C., during 45 minutes and is then poured into a mixture of 100 parts of ice and 50 parts of water. A solution of 8 parts of potassium hydroxide in 50 parts of water is added slowly at 15° to 20° C., at such a rate that when 75% of the said solution is added, the mixture is still acid and the remaining 25% of the said solution is then added all at once. The mixture is then boiled for 5 minutes, cooled and filtered and the solid residue is washed with water. The product is 5-methoxyindole-3-aldehyde of M.P. 181–182° C., obtained in a yield of 94% calculated on the 5-methoxyindole used.

Example 4

8.4 parts of phosphorus oxychloride are added dropwise with stirring to 18 parts of dimethylformamide cooled to 10° to 20° C. A solution of 10 parts of 6-benzyloxyindole in 4.5 parts of dimethylformamide is then added slowly at 20° to 30° C., after which the mixture is heated at 35° C., for 45 minutes. It is then cooled and poured into a mixture of 50 parts of crushed ice and 100 parts of water. A solution of 9.5 parts of sodium hydroxide in 100 parts of water is added slowly, with good stirring, at 20° to 30° C., the rate of addition of the aqueous sodium hydroxide is such that 75% of it is added during about 30 minutes and the mixture remains acid to litmus. The remaining 25% of the sodium hydroxide solution is then added all at once and the mixture is boiled for 5 minutes and then cooled to 50° to 55° C., and filtered. The solid residue is washed with cold water and dried when 6-benzyloxyindole-3-aldehyde of M.P. 208–209° C., is obtained in a yield of 90% calculated on the 6-benzyloxyindole used. It may be purified by crystallization from β-ethoxyethanol when it has M.P. 215–216° C.

Example 5

14.3 parts of phosphorus tribromide are added slowly to 18 parts of dimethylformamide with stirring, the temperature being maintained at 10° C. to 20° C., by external cooling. A solution of 5 parts of 6-benzyloxyindole in 9 parts of dimethylformamide is added slowly at 20° to 30° C. The mixture is then heated at 35° to 40° C., for 45 minutes with constant agitation. The reaction mixture is then poured into a mixture of 100 parts of ice and 100 parts of water, and to the mixture so obtained, is added a solution of 10 parts of sodium hydroxide in 100 parts of water, gradually during 30 minutes at 20° to 30° C. The alkaline solution is boiled for 5 minutes, cooled to 50° C., and filtered. The solid residue is washed with cold water and there is thus obtained 6-benzyloxyindole-3-aldehyde, M.P. 211–212° C., in a yield of 82% based on the 6-benzyloxyindole used. It may be purified by crystallization, for example, from β-ethoxyethanol when it has M.P. 215–216° C.

*Example 6*

8.4 parts of phosphorus oxychloride are added slowly at 10° to 20° C., to a stirred mixture of 20 parts of dioxan and 4.5 parts of dimethylformamide. A solution of 5 parts of 6-benzyloxyindole in 10 parts of dioxan is added gradually at 20 to 30° C., and the mixture is then warmed at 35° to 40° C., for 45 minutes. It is then poured into a mixture of 50 parts of ice and 100 parts of water. The stirred mixture is treated with a solution of 10 parts of sodium hydroxide in 100 parts of water, added at 20° to 30° C., during 30 minutes. The alkaline mixture is boiled for 5 minutes and then cooled to 50° C., and filtered. The solid residue is washed with cold water and dried and there is thus obtained 6-benzyloxyindole-3-aldehyde, M.P. 208° C., in a yield of 87% based on the 6-benxyloxyindole used. It may be purified by crystallization, for example, from β-ethoxyethanol when it has M.P. 215–216° C.

*Example 7*

2 parts of phosphorus pentachloride are added gradually with stirring to 18 parts of dimethylformamide maintained at 10° to 20° C., by external cooling. A solution of 1.5 parts of 6-benzyloxyindole in 4.5 parts of dimethylformamide is then added at 20° to 30° C. The temperature is then raised to 35° to 38° C., and held there for 45 minutes. The syrupy solution is then poured with good agitation into a mixture of 50 parts of ice and 100 parts of water and a solution of 5 parts of sodium hydroxide in 50 parts of water is then added during 20 minutes. The mixture is boiled for 10 minutes, cooled to about 50° C., and filtered. The solid residue is washed well with cold water and dried. The 6-benzyloxyindole-3-aldehyde thus obtained has M.P. 209° to 211° C., and is sufficiently pure for further use. It may be crystallized from β-ethoxyethanol when the melting point is raised to 215° to 216° C.

*Example 8*

12.5 parts of phosphorus oxychloride are added with stirring to 24 parts of dimethylformamide cooled to 10–20° C., and to this solution is added a solution of 9.8 parts of 5-methylindole in 6.5 parts of dimethylformamide. The mixture is then heated at 35° C., for 45 minutes and the syrupy liquid is then poured onto 40 parts of ice. A solution of 15.3 parts of sodium hydroxide in 64 parts of water is then added at 20–30° C., with stirring, the rate of addition of the sodium hydroxide solution being adjusted so that ¾ of the total amount to be added is run in during about 30 minutes when the mixture is still acid to litmus. The remaining sodium hydroxide solution is then added in one portion and the mixture so obtained is boiled for 5 minutes. It is then cooled and filtered and the solid residue is washed with water and dried to give 5-methylindole-3-aldehyde, M.P. 148–149° C.

*Example 9*

8.3 parts of phosphorus oxychloride are added dropwise with stirring to 13.5 parts of dimethylformamide at 10–20° C., and then adding thereto a solution of 3 parts of 5-chloroindole in 4.5 parts of dimethylformamide slowly at 20–30° C. The mixture is then heated at 35° C., for 45 minutes and the syrupy liquid is poured onto 50 parts of ice. A solution of 9.5 parts of sodium hydroxide in 50 parts of water is added slowly at 20–30° C., so that ¾ of the solution is added in about 20 minutes and the mixture is still acid to litmus. The last ¼ of the sodium hydroxide solution is added all at once and the solution is boiled for 3 minutes. The mixture is then cooled to 60° C., and filtered and the solid residue is washed with water and dried. There is thus obtained 5-chloroindole-3-aldehyde, M.P. 215–216° C.

PREPARATION OF 3-β-NITROVINYLINODOLES, FORMULA IV

*Example 10*

6 parts of 5-benzyloxyindole-3-aldehyde, 26 parts of acetic acid, 4 parts of ammonium acetate and 5.65 parts of nitromethane are heated together under reflux for 2 hours. The mixture is then cooled and poured into a mixture of 44 parts of ammonium hydroxide solution of specific gravity 0.88 and 200 parts of water. The mixture is then extracted with 360 parts of ether, the ethereal solution is dried and the ether is evaporated off. The residual solid is 5-benzyloxy-3-β-nitrovinylindole which when recrystallized from benzene has a melting point of 181–182° C.

*Example 11*

4.4 parts of 5-benzyloxyindole-3-aldehyde, 25 parts of nitromethane and 1 part of ammonium acetate are heated under reflux for 30 minutes. The mixture is then cooled and filtered. The solid residue is then washed and dried and crystallized from benzene. There is obtained 5-benzyloxy-3-β-nitrovinylindole of M.P. 181–182° C.

*Example 12*

2.3 parts of indole-3-aldehyde, 10 parts of nitromethane and 1 part of ammonium acetate are heated together under reflux for 10 minutes. The mixture is then cooled and filtered. The solid residue is washed and dried and crystallized from benzene. 3-β-nitrovinyl-indole is obtained of M.P. 171–172° C.

*Example 13*

A mixture of 5 parts of indole-3-aldehyde hydrate, 10 parts of nitroethane and 1 part of ammonium acetate is heated for 30 minutes at 95–98° C. The reaction mixture is then cooled and filtered and the solid residue is washed with two portions of 50 parts of hot water. The residue is crystallized from methanol to give 3-β-methyl-β-nitrovinylindole as yellow prisms, M.P. 195–196° C.

*Example 14*

A mixture of 5 parts of indole-3-aldehyde hydrate, 10 parts of nitroethane and 0.25 part of n-butylamine is heated at 95–98° C., for 1 hour. The reaction mixture is then cooled and filtered and the solid residue is washed with hot water. It is then crystallized from methanol to give 3-β-methyl-β-nitrovinylindole, M.P. 195–196° C.

*Example 15*

A mixture of 10 parts of indole-3-aldehyde hydrate, 20 parts of 1-nitropropane and 2 parts of ammonium acetate is heated at 95–98° C., for 3 hours. The mixture is then cooled and allowed to stand for 18 hours. It is then filtered and the solid residue is washed with 100 parts of hot water. It is dried and crystallized from methanol to give 3-β-ethyl-β-nitrovinylindole as orange-yellow prisms, M.P. 134–136° C.

*Example 16*

A mixture of 10 parts of indole-3-aldehyde hydrate, 20 parts of 1-nitropropane and 1 part of benzylamine is heated at 98° C., for 24 hours. The reaction mixture is then cooled to room temperature and allowed to stand for 18 hours. It is then filtered and the filtrate is diluted with 150 parts of petroleum ether (B.P. 100–120° C.) and the mixture is filtered. The solid residue is crystallized from methanol to give 3-β-ethyl-β-nitrovinylindole, M.P. 134–136° C.

*Example 17*

5 parts of 5-benzyloxyindole-3-aldehyde are dissolved in 45 parts of dimethylformamide at 100° C., and then 2 parts of ammonium acetate and 2 parts of nitromethane are added. The reaction mixture is heated at 100–105° C., for 10 minutes and is then poured into 500 parts of cold water with efficient stirring. The mixture is filtered and the solid residue is washed with cold water and then crystallized from methanol to give 5-benzyloxy-3-β-nitrovinylindole, M.P. 181–182° C.

Example 18

A mixture of 10 parts of 5-benzyloxyindole-3-aldehyde, 25 parts of nitroethane and 4 parts of ammonium acetate is stirred and heated at 105–108° C., for 30 minutes until completely dissolved. The solution is then heated at 98–100° C., for a further 30 minutes and then allowed to cool to room temperature. After 3 hours, the mixture is filtered and the solid residue is washed with 250 parts of cold water, and crystallized from ethanol. There is thus obtained 5-benzyloxy-3-β-methyl-β-nitrovinylindole as red prisms, M.P. 195–196° C.

Example 19

A mixture of 10 parts of 5-benzyloxyindole-3-aldehyde, 25 parts of 1-nitropropane and 5 parts of ammonium acetate is stirred and heated at 110° C., for 45 minutes and then at 98° C., for a further 2 hours. The mixture is then cooled and filtered and the solid residue is washed with cold water and crystallized from ethanol to give 5-benzyloxy-3-β-ethyl-β-nitrovinylindole, M.P. 175–176° C.

Example 20

A mixture of 5 parts of 5-benzyloxyindole-3-aldehyde, 10 parts of n-1-nitro-octane, 2 parts of ammonium acetate and 10 parts of dimethylformamide is heated at 110–115° C., for 10 minutes. The reaction mixture is then cooled to room temperature and allowed to stand for 2 hours. It is then stirred with 80 parts of petroleum ether (B.P. 60–80° C.) for 10 minutes and the mixture is filtered. The solid residue is crystallized from petroleum ether (B.P. 60–80° C.) to give 5-benzyloxy-3-β-n-heptyl-β-nitrovinylindole as yellow prisms, M.P. 128° C.

Example 21

A mixture of 5 parts of 5-methylindole-3-aldehyde, 25 parts of nitromethane and 2.5 parts of ammonium acetate is heated at 100–101° C., for 10 minutes. The reaction mixture is then cooled and after standing for 18 hours it is filtered and the solid residue is washed with water. It is then crystallized from methanol to give 5-methyl-3-β-nitrovinylindole as red prisms, M.P. 160–161° C.

Example 22

A mixture of 5 parts of 5-methylindole-3-aldehyde, 10 parts of nitroethane and 2 parts of ammonium acetate is heated at 100° C., for 10 minutes. The mixture is then cooled and filtered and the solid residue is washed with 8.7 parts of benzene and then with cold water. It is crystallized from methanol to give 5-methyl-3-β-methyl-β-nitrovinylindole as orange needles, M.P. 184–187° C.

Example 23

A mixture of 2.5 parts of 5-chloroindole-3-aldehyde, 20 parts of nitromethane and 1 part of ammonium acetate is heated for 10 minutes at 95–100° C. After standing at room temperature for 1 hour, the mixture is filtered and the solid residue is washed with cold water and dried. It is then crystallized from methanol to give 5-chloro-3-β-nitrovinylindole as orange-yellow prisms, M.P. 186–187° C.

Example 24

A mixture of 4 parts of 5-methoxyindole-3-aldehyde, 10 parts of nitroethane and 2 parts of ammonium acetate is heated to 105–108° C., for 10 minutes. The mixture is then allowed to cool to room temperature and stand for 2 hours. It is then filtered and the solid residue is washed with cold water and crystallized from methanol. There is thus obtained 5-methoxy-3-β-methyl-β-nitrovinylindole as orange needles, M.P. 182–184° C.

Example 25

A mixture of 5 parts of 6-benzyloxyindole-3-aldehyde, 1 part of ammonium acetate and 20 parts of nitromethane is heated gently under reflux until a solution is obtained. The mixture is then cooled to room temperature and filtered and the solid residue is washed with 4 parts of methanol and then with 200 parts of cold water. It is then crystallized from ethanol to give 6-benzyloxy-3-β-nitrovinylindole as orange prisms, M.P. 186–187° C., with decomposition.

Example 26

A mixture of 4 parts of 6-benzyloxyindole-3-aldehyde, 5 parts of nitromethane, 2 parts of ammonium acetate and 9 parts of β-ethoxyethanol is heated gently under reflux for 10 minutes until a complete solution is obtained. The mixture is then allowed to cool and to stand at room temperature. It is then filtered and the solid residue is crystallized from ethanol to give 6-benzyloxy-3-β-nitrovinylindole, M.P. 186–187° C., with decomposition.

PREPARATION OF INDOLES OF FORMULA V

Example 27

5.2 parts of 5-benzyloxy-3-β-nitrovinylindole are dissolved in a mixture of 44 parts of tetrahydrofuran and 180 parts of ether. The solution is then added gradually with stirring to 5 parts of lithium aluminium hydride in 36 parts of ether. The mixture is boiled under reflux for 6 hours, cooled, and 30 parts of water are then added slowly. The solid is then filtered off and washed with 36 parts of ether. The combined filtrate and washings are dried and the solvent is distilled off. The residue is extracted with 180 parts of ether and the solution is saturated with hydrogen chloride and filtered. The solid residue is washed and dried and then crystallized from a mixture of 16 parts of methanol and 135 parts of ethyl acetate. There is obtained 5-benzyloxytryptamine hydrochloride, of M.P. 257–258° C., with decomposition.

Example 28

A solution of 3-β-nitrovinylindole in ether obtained from 6 parts of indole-3-aldehyde as described below is added slowly to 5 parts of lithium aluminium hydride stirred in 36 parts of ether. The mixture is boiled for 6 hours and then cooled and 30 parts of water are added slowly. It is then filtered and the solid is washed with 72 parts of ether. The combined filtrate and washings are dried and the solvent is evaporated. The residual oil is distilled and tryptamine is obtained, B.P. 140–150° C./0.3 mm. It forms a picrate which crystallizes from ethanol and has M.P. 247° C. with decomposition.

The solution of 3-β-nitrovinylindole used as starting material in the above process may be obtained as follows:

A solution of 6 parts of indole-3-aldehyde in 26 parts of acetic acid is heated under reflux for 2 hours with 4 parts of ammonium acetate and 5.65 parts of nitromethane. The solution is cooled and poured into a mixture of 200 parts of cold water and 44 parts of ammonium hydroxide solution (sp. gr. 0.88). It is then extracted with two portions of 72 parts and one portion of 36 parts of ether. The combined extracts are then dried, the solution is filtered and the filtrate is then suitable for use as starting material.

Example 29

5 parts of 5-benzyloxy-3-β-nitrovinylindole are placed in the thimble of a Soxhlet extractor. The extractor flask contains 5 parts of lithium aluminium hydride and 180 parts of ether and is heated gently so that the starting material is continuously extracted with ether. When all the 5-benzyloxy-3-β-nitrovinylindole is extracted, in about 6 hours, the ether is cooled and 30 parts of water are added slowly and continuously. The mixture is filtered and the solid residue is washed with two portions (15 parts each) of ether. The ethereal filtrate and washes are combined, dried over potassium hydroxide and then saturated with dry hydrogen chloride. The mixture is filtered, the solid residue is washed with ether, and there is obtained 5-benzyloxytryptamine hydrochloride, M.P. 257–258° C., with decomposition.

*Example 30*

A mixture of 3.1 parts of 5-benzyloxy-3-β-methyl-β-nitrovinylindole, 3 parts of lithium aluminium hydride and 180 parts of ether is treated by the process as described in Example 29. The product so obtained is crystallized from a mixture of methanol and ethyl acetate to give 3-β-aminopropyl-5-benzyloxyindole hydrochloride as white needles, M.P. 257–258° C., with decomposition.

The succinate may be obtained from a solution of 1 part of 3-β-aminopropyl-5-benzyloxyindole hydrochloride in 30 parts of hot water by adding a solution of sodium hydroxide until the free base is completely precipitated when the mixture has a pH value of 8 to 9. 0.25 part of succinic acid is then added and the mixture is boiled for 2 to 3 minutes. It is then filtered hot and the filtrate is allowed to cool. The mixture so obtained is filtered and the solid residue is washed with 25 parts of water and dried. There is thus obtained 3-β-aminopropyl-5-benzyloxyindole succinate in the form of needles, M.P. 181–182° C.

*Example 31*

A mixture of 4 parts of 5-benzyloxy-3-β-ethyl-β-nitrovinylindole, 5 parts of lithium aluminium hydride and 180 parts of ether is treated by the process as described in Example 29. There is likewise obtained 3-β-aminobutyl-5-benzyloxyindole hydrochloride, M.P. 243–244° C., with decomposition.

*Example 32*

A mixture of 5 parts of 3-β-methyl-β-nitrovinylindole, 5 parts of lithium aluminium hydride and 180 parts of ether is treated by the process as described in Example 29. The hydrochloride so obtained is crystallized from a mixture of methanol and ethyl acetate to give 3-β-aminopropylindole hydrochloride, in the form of silvery plates, M.P. 215–217° C., with decomposition.

*Example 33*

A mixture of 3 parts of 3-β-ethyl-β-nitrovinylindole, 3 parts of lithium aluminium hydride and 180 parts of ether is treated by the process as described in Example 29. The hydrochloride so obtained is crystallized from a mixture of methanol and ethyl acetate to give 3-β-amino-butylindole hydrochloride in the form of silvery plates, M.P. 218–219° C., with decomposition.

*Example 34*

A mixture of 3 parts of 5-methyl-3-β-nitrovinylindole, 3 parts of lithium aluminium hydride and 180 parts of ether is treated by the process as described in Example 29. The hydrochloride so obtained is crystallized from a mixture of methanol and ethyl acetate to give 3-β- aminoethyl-5-methylindole hydrochloride in the form of silvery plates, M.P. 289–291° C., with decomposition.

*Example 35*

A mixture of 4.4 parts of 5-methyl-3-β-methyl-β-nitrovinylindole, 5 parts of lithium aluminium hydride and 180 parts of ether is treated by the process as described in Example 29. The hydrochloride so obtained is crystallized from a mixture of methanol and ethyl acetate to give 3-β-aminopropyl-5-methylindole hydrochloride, M.P. 256–257° C., with decomposition.

*Example 36*

A mixture of 2 parts of 5-chloro-3-β-nitrovinyl indole, 2.5 parts of lithium aluminium hydride and 180 parts of ether is treated by the process as described in Example 29. The hydrochloride so obtained is crystallized from a mixture of methanol and ethyl acetate to give 5-chlorotryptamine hydrochloride, M.P. 286–289° C., with decomposition.

*Example 37*

A mixture of 3 parts of 5-methoxy-3-β-methyl-β-nitrovinylindole, 3 parts of lithium aluminium hydride and 180 parts of ether is treated by the process as described in Example 29. The hydrochloride so obtained is crystallized from a mixture of acetone and methanol to give 3-β-aminopropyl - 5 - methoxyindole hydrochloride, M.P. 220–221° C.

*Example 38*

A mixture of 3.5 parts of 6-benzyloxy-3-β-nitrovinylindole, 4 parts of lithium aluminium hydride and 180 parts of ether is treated by the process as described in Example 29. The hydrochloride so obtained is crystallized from a mixture of methanol and ethyl acetate to give 6-benzyloxytryptamine hydrochloride, M.P. 255–256° C., with decomposition.

*Example 39*

A solution of 4 parts of 6-benzyloxy-3-β-nitrovinylindole in 40 parts of tetrahydrofuran is added during 15 minutes to a stirred suspension of 4 parts of lithium aluminium hydride in 80 parts of tetrahydrofuran. The mixture is stirred for a further 30 minutes and then allowed to cool. 20 parts of water are added very slowly and the mixture is filtered. The solid residue is washed with 15 parts of tetrahydrofuran and the combined filtrate and washing is evaporated to dryness. The residue is dissolved in 180 parts of ether and the solution is dried over potassium hydroxide and then saturated with dry hydrogen chloride. There is thus obtained 6-benzyloxytryptamine hydrochloride which when crystallized from a mixture of methanol and ethyl acetate has M.P. 255–256° C. with decomposition.

*Example 40*

A mixture of 20 parts of 3-β-nitrovinylindole, 15 parts of lithium aluminium hydride and 360 parts of ether is treated by the process as described in Example 29. The hydrochloride so obtained is crystallized from a mixture of methanol and ethyl acetate to give tryptamine hydrochloride, M.P. 250–251° C., with decomposition.

The present application is a continuation-in-part of my three co-pending applications Serial No. 636,458, Serial No. 636,465 and Serial No. 636,466, all filed on January 28, 1957, and now abandoned.

Having described the invention, what is claimed as new is:

An indole compound of the formula:

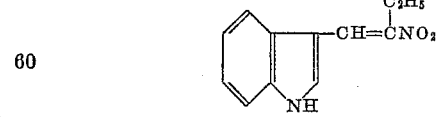

References Cited in the file of this patent

UNITED STATES PATENTS

| | | |
|---|---|---|
| 1,807,693 | Kalischer et al. | June 2, 1931 |
| 2,708,197 | Speeter | May 10, 1955 |
| 2,715,129 | Hamlin | Aug. 9, 1955 |
| 2,804,462 | Speeter | Aug. 27, 1957 |
| 2,814,625 | Speeter | Nov. 26, 1957 |
| 2,870,162 | Speeter | Jan. 20, 1959 |

(Other references on following page)

FOREIGN PATENTS 614,325    Germany _____ June 6, 1935

OTHER REFERENCES

Kermack et al.: Jour. Chem. Soc. (London), p. 1878 (1922).
Harvey et al.: Chem. Ab., vol. 32 (1938), p. 2114.
Van Order et al.: Chem. Reviews, vol. 30, p. 76 (1942).
Snyder et al.: J.A.C.S., vol. 69, pp. 3140–3141 (1947).
Marchant et al.: Chem. Ab., vol. 46 (1952), page 961.
Onda et al.: Jour. Pharm. Soc., Japan, vol. 76, pp. 472–73 (1956).
Vane: British Jour. of Pharmacal., vol. 14, pp. 87–89 (1959).
Smith: J. Chem. Soc., pp. 3842–3846 (1954).
Seka: Deutsche Chemische Berichte, vol. 57, pp. 1868–1871 (1924).
Ramirez et al.: J.A.C.S., vol. 72, pp. 2781–2782 (1950).
Hamlin et al.: J.A.C.S., vol. 71, pp. 2210–2212 (1949).